US008823990B2

(12) United States Patent
Cudak et al.

(10) Patent No.: US 8,823,990 B2
(45) Date of Patent: Sep. 2, 2014

(54) PRINT JOB DISTRIBUTION WITHIN A PRINTING SYSTEM

(71) Applicant: International Business Machines Corporation, Armonk, NY (US)

(72) Inventors: Gary D. Cudak, Creedmoor, NC (US); Lydia M. Do, Raleigh, NC (US); Christopher J. Hardee, Raleigh, NC (US); Adam Roberts, Moncure, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/731,612

(22) Filed: Dec. 31, 2012

(65) Prior Publication Data

US 2014/0185084 A1 Jul. 3, 2014

(51) Int. Cl.
*G06F 3/12* (2006.01)
*G06K 15/00* (2006.01)
*H04N 1/36* (2006.01)

(52) U.S. Cl.
CPC .................................. *G06F 3/1296* (2013.01)
USPC ........... 358/1.15; 358/1.1; 358/1.14; 358/504

(58) Field of Classification Search
USPC .............. 358/1.15, 1.14, 1.1, 1.9, 3.23, 1.16, 358/296, 504, 448, 462, 502; 399/27, 24, 399/23, 31, 35, 57
See application file for complete search history.

(56) References Cited

U.S. PATENT DOCUMENTS

| 5,636,032 A * | 6/1997 | Springett .................... 358/296 |
| 5,784,090 A | 7/1998 | Selensky et al. |
| 6,097,497 A | 8/2000 | McGraw |
| 6,132,021 A | 10/2000 | Smith et al. |
| 6,467,869 B1 | 10/2002 | Merz et al. |
| 6,817,693 B2 | 11/2004 | Phillips et al. |
| 6,851,799 B2 | 2/2005 | Trafton et al. |
| 6,977,755 B2 | 12/2005 | Payne et al. |
| 7,738,816 B2 | 6/2010 | Sakita et al. |
| 7,936,468 B2 | 5/2011 | Ferlitsch |
| 2002/0026379 A1 | 2/2002 | Chiarabini et al. |
| 2003/0090697 A1* | 5/2003 | Lester et al. ................ 358/1.14 |
| 2004/0135838 A1* | 7/2004 | Owen et al. .................... 347/19 |
| 2007/0081828 A1* | 4/2007 | Radulski et al. ............... 399/27 |
| 2008/0215454 A1* | 9/2008 | Haines et al. .................. 705/26 |
| 2012/0092720 A1 | 4/2012 | Jaudon et al. |

FOREIGN PATENT DOCUMENTS

JP 4208553 B2 1/2009

* cited by examiner

*Primary Examiner* — Ngon Nguyen
(74) *Attorney, Agent, or Firm* — Stephen R. Yoder

(57) ABSTRACT

Disclosed are a method, computer program product, and system for print job distribution. An amount of available consumable resources for each of a plurality of printers is determined. An estimated usage of the consumable resources for the plurality of printers for one or more printer jobs in a printer queue is determined. A maintenance schedule related to the maintenance of the consumable resources for each of the plurality of printers is accessed. A print distribution plan for each print job in the printer queue is determined, based at least in part on the amount of available consumable resources for each of the plurality of printers, the estimated usage of consumable resources for the plurality of printers for each printer job in a printer queue, and the maintenance schedule related to the maintenance of the consumable resources for each of the plurality of printers.

12 Claims, 3 Drawing Sheets

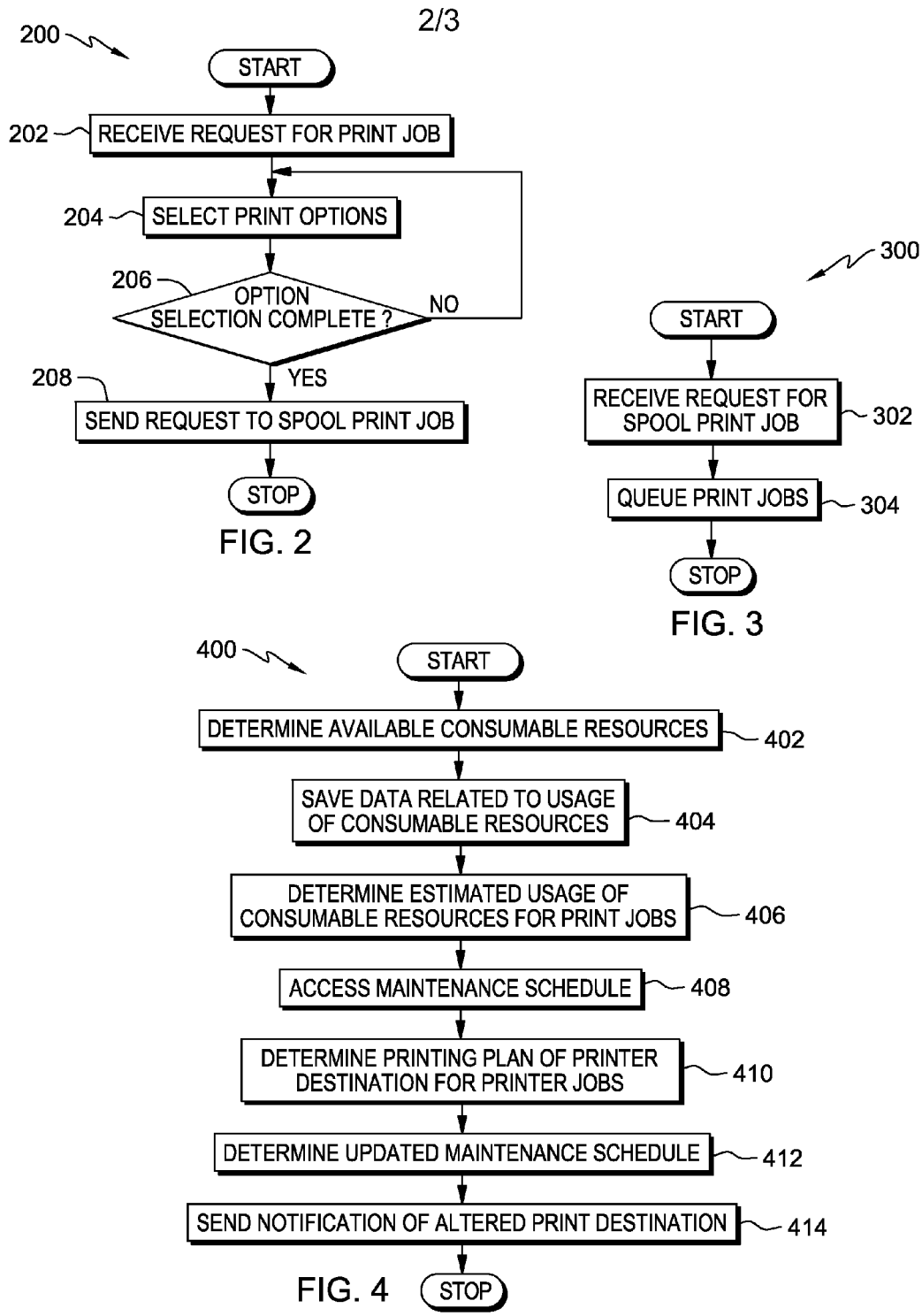

PRINT JOB DISTRIBUTION WITHIN A PRINTING SYSTEM

FIELD OF THE INVENTION

The present invention relates generally to the field of printing systems and more particularly to print job distribution within a printing system.

BACKGROUND OF THE INVENTION

Print managers and printers have become very advanced. In the age of network printing in large users environments, printer resources that require manual replacement can be quickly depleted. Types of printer resources that are consumable may include paper and ink. Known in the art are methods to determine if a print job was not able to succeed and that there are not enough consumable resources to complete a job on a specific printer device. In some cases, consumable resources such as an ink cartridge may be replaced when there is still a portion of the consumable resource left, leading to waste of the consumable resource. Further, replacement of these consumable resources may be on a schedule, resulting in extended downtime for some printers in an environment.

SUMMARY

One embodiment of the present invention discloses a method, computer program product, and system for print job distribution. In exemplary embodiments, an amount of available consumable resources for each of a plurality of printers is determined. In exemplary embodiments, an estimated usage of the consumable resources for the plurality of printers for one or more printer jobs in a printer queue is determined. In exemplary embodiments, a maintenance schedule related to the maintenance of the consumable resources for each of the plurality of printers is accessed. In exemplary embodiments, a print distribution plan for each print job in the printer queue is determined, based at least in part on the amount of available consumable resources for each of the plurality of printers, the estimated usage of consumable resources for the plurality of printers for each printer job in a printer queue, and the maintenance schedule related to the maintenance of the consumable resources for each of the plurality of printers.

BRIEF DESCRIPTION OF THE SEVERAL VIEWS OF THE DRAWINGS

FIG. 2 is a flowchart depicting operational steps of printing program 200 for sending print jobs to a printing queue located on server computer 100, in accordance with an embodiment of the present invention.

FIG. 3 is a flowchart depicting operational steps of print job receiving program 300, in accordance with an embodiment of the present invention.

FIG. 4 is a flowchart depicting operational steps of a print job distribution program, on a server computer within the print job distribution environment of FIG. 1, in accordance with an embodiment of the present invention.

DETAILED DESCRIPTION

Figure 1:
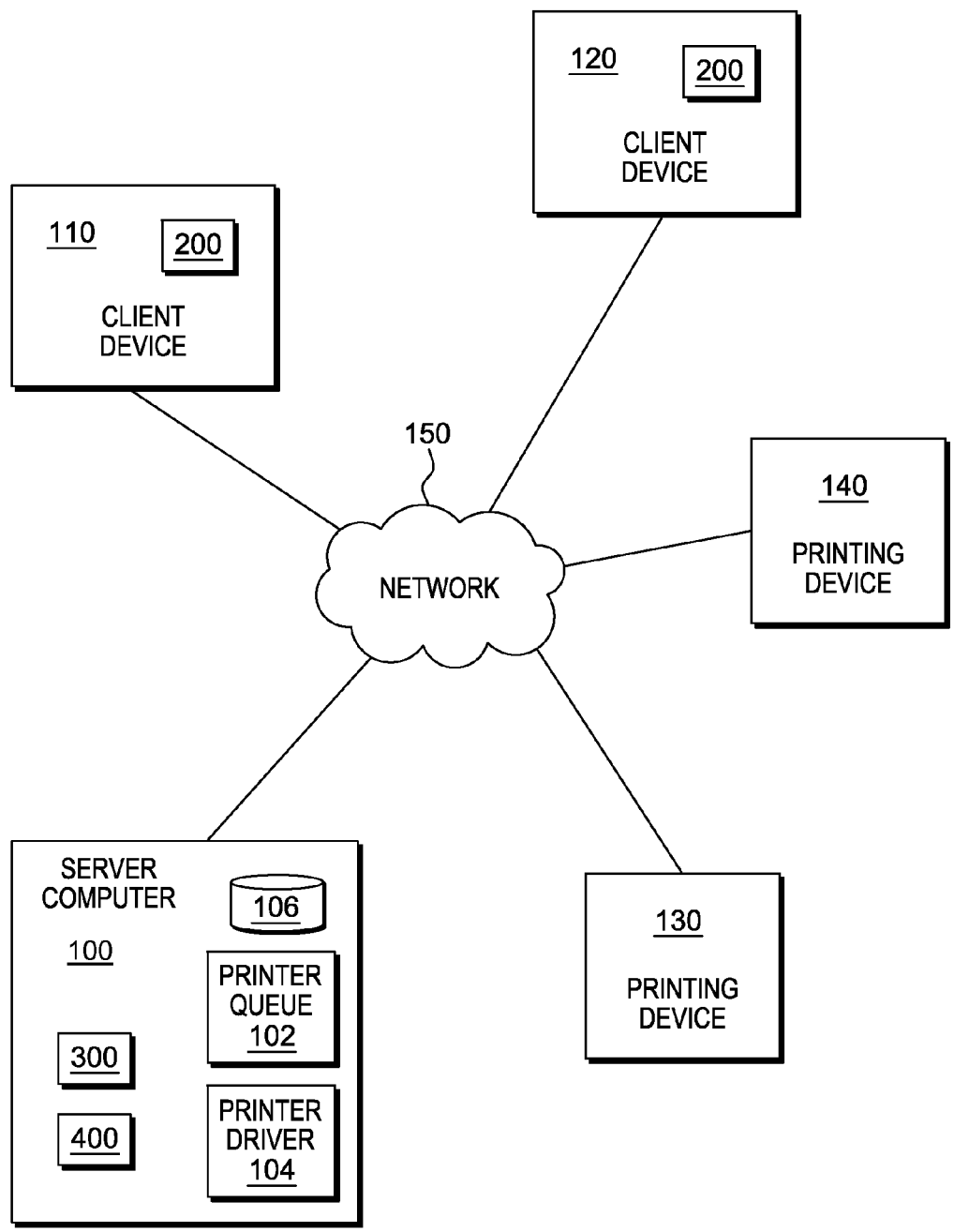
FIG. 1 is a functional block diagram illustrating a print job distribution environment, in accordance with an embodiment of the present invention.

Exemplary embodiments of the present invention provide a system, method, or computer program product that routes printing jobs to facilitate optimized consumption of the most amount of consumable resources within each printing device within a plurality of printing devices. Furthermore, exemplary embodiments of the present invention increase the overall amount of time the printing devices are available to perform printing services by directing printing jobs to or away from the printing devices based at least in part utilizing the maximum amount of consumable resources of the printing devices before the printing devices are scheduled to be maintenanced.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a distributed data processing environment, generally designated 100, in accordance with one embodiment of the present invention.

While those skilled in the art will appreciate that embodiments of the present invention may be practiced in a variety of different environments with many types of system configurations, FIG. 1 provides a representative networked configuration that may be used in association with the present invention. While FIG. 1 illustrates an embodiment that includes two computers, two printer devices, and optionally a printer server connected to a network, alternative embodiments include one or more computers, less than two printer devices, more than two printer devices, no server, and/or more than one server connected to a network. Moreover, other embodiments of the present invention include local, networked, or peer-peer printing environments, where one or more computers are connected to a plurality of printing devices for rendering print jobs.

Those skilled in the art will appreciate that embodiments of the present invention embrace a variety of different system configurations. For example, some embodiments of the present invention embrace local printer environments, network printer environments, remote printer environments, etc. In one embodiment, the system configuration includes one or more printer devices (e.g., multifunctional peripherals "MFP" or other printer devices), one or more client computer devices, optionally a server computer device, and a network communication that enables transmitting information relating to print jobs. Other embodiments of the present invention embrace one or more computer devices locally or remotely connected to a plurality of printer devices for the rendering of print jobs.

Distributed data processing environment 10 includes server computer 100, client devices 110 and 120, printing devices 130 and 140 all interconnected over network 150.

Server computer 100 may be a laptop computer, tablet computer, netbook computer, personal computer (PC), a desktop computer, a personal digital assistant (PDA), a smart phone, or any programmable electronic device capable of communicating with client devices 110 and 120 via network 150. Server computer 100 receives and queues print jobs from client devices 110 and 120 in printing queue 102 before sending the print jobs to printing devices 140 and 130. Server computer 100 includes printer driver 104 for converting the data to be printed to a format for printing devices 130 and 140. Server computer 100 includes storage device 106 for storing the print job data, along with a printing device maintenance schedule, or other data that may need to be utilized for print job destination program 400 to execute. Server computer 100 includes print job receiving program 300 and print job destination program 400. Print job receiving program 300 receives print jobs from client devices 110 and 120 and queues the print jobs before sending the print jobs to printing devices 130 and 140. Print job destination program 400 optimizes the delivery of print jobs to printing devices 130 and 140 to decrease the amount of consumable resources wasted before being replaced, while also minimizing the amount of downtime of printing devices 130 and 140.

In various embodiments of the present invention, client devices 110 and 120 can each respectively be a laptop computer, tablet computer, netbook computer, personal computer (PC), a desktop computer, a personal digital assistant (PDA), a smart phone, or any programmable electronic device capable of communicating with server computer 100 via network 150. Client devices 110 and 120 includes printing program 200 for sending print jobs to a printing queue located on server computer 100.

Network 150 can be, for example, a local area network (LAN), a wide area network (WAN) such as the Internet, or a combination of the two, and can include wired, wireless, or fiber optic connections. In general, network 150 can be any combination of connections and protocols that will support communications between server computer 100, client devices 110 and 120, and printing devices 130 and 140. As provided above, while printer devices 130 and 140 are connected to network 150, embodiments of the present invention embrace the use of peripheral devices (e.g., printer devices) that are locally connected to a computer device, that are configured in a peer-to-peer printing environment, or that are configured in a wireless network environment.

Printer devices 130 and 140 may be any type of printing device that may be used to render a print job. In exemplary embodiments, the capabilities of any one of the printer devices are heterogeneous to the capabilities of any other printer device (e.g., at least one of the capabilities of one printing device, such as printer device 130, are different from the capabilities of another printer device, such as printer device 140). In another embodiment, the capabilities of the printer devices are homogeneous.

Figure 5:
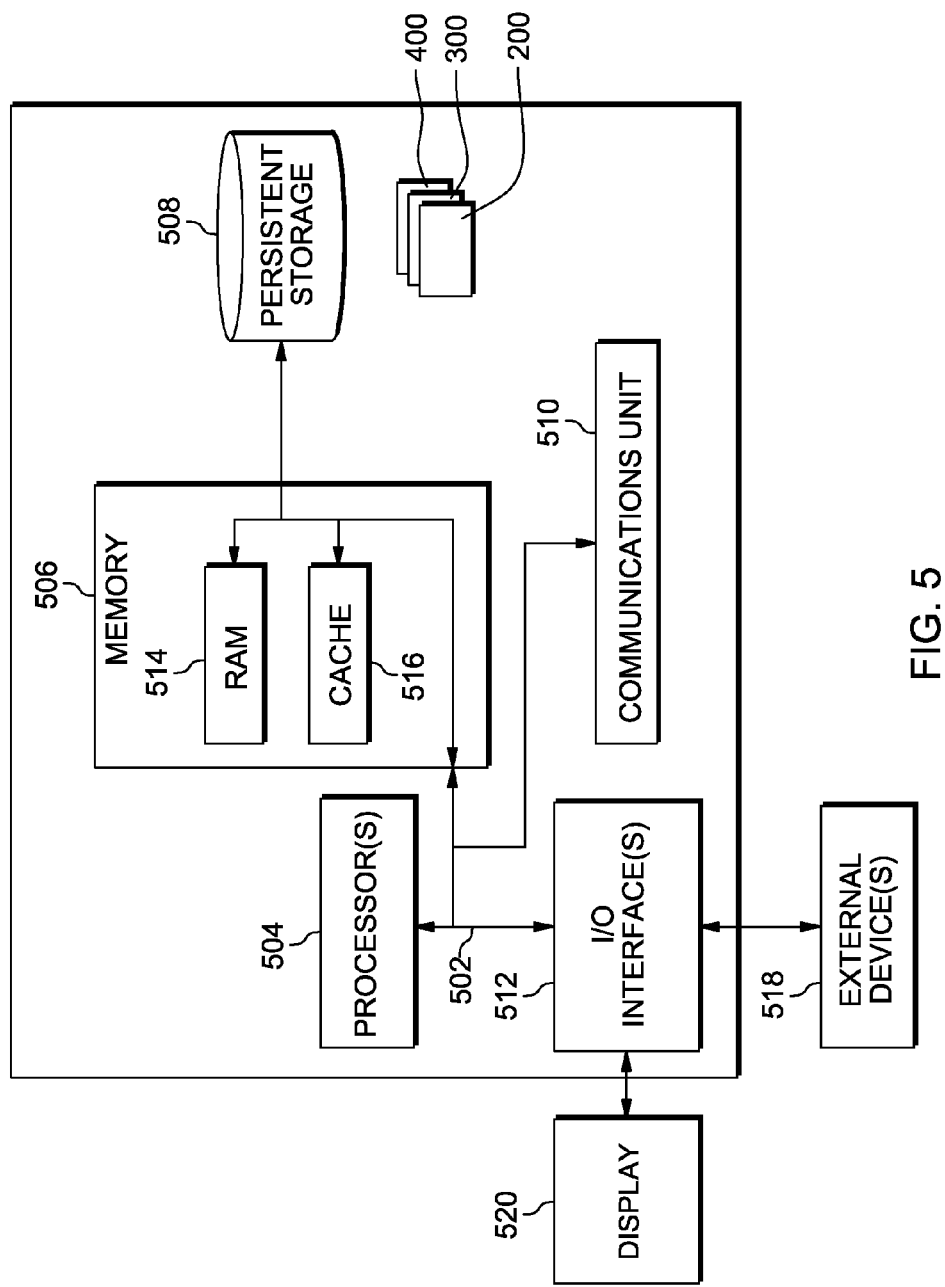
FIG. 5 depicts a block diagram of components of the proxy server computer executing the intelligent mapping program, in accordance with an embodiment of the present invention.

Server computer 100, client devices 110 and 120, and printing devices 130 and 140 may include internal and external hardware components, as depicted and described in further detail with respect to FIG. 5.

FIG. 2 is a flowchart depicting operational steps of printing program 200 for sending print jobs to a printing queue located on server computer 100, in accordance with an embodiment of the present invention.

At step 202, printing program 200 receives a request for a print job when a user initiates one or more print jobs that include one or more documents, each having one or more pages, wherein one or more copies are to be rendered. The print job(s) may be preprocessed into printer ready data, such as an application rendering its output into a page description language (PDL), such as PCL, Postscript™, PDF, TIFF, etc. The print job may also be journaled, where the rendering instructions are recorded, and the playback of the rendering instructions is deferred, such as with an enhanced meta file (EMF), a printer meta file (PMF), etc.

Before printing program receives a request for a print job, the user selects a command, sequence of commands, or other stimulus to the client device, to indicate an intention to spool the print job(s). Printing program 200 responds to the user by presenting the user a dialog (e.g., a printer user interface, command line query, front panel display, etc.) so that the user can select options relating to the spooling of the print job(s), as indicated by step 204. In exemplary embodiments, one of the options is the selection of one or more printer devices (e.g., printer, plotter, MFP, CD burner, fax machine, etc.) to which the print job(s) are to be despooled. Once the printer device is selected, the computer device responds by loading a printer driver and print processor associated with the printer devices. The printer driver responds, automatically or by user initiation, to the user by presenting the user a dialog in which the user may select options relating to the capabilities of the printing device (e.g., print quality, paper size, orientation, tray selection, manual feed, duplexing, collation, stapling, hole-punching, watermarks, etc.)

At decision block 206, a determination is made as to whether or not all the selection of the various options is complete. If it is determined that the selection is not complete, execution returns back to step 204. Once the user has completed the selecting options specific to the print job(s) and the printing device(s), printing program 200 sends the spooling of the print job(s) at step 208. In some embodiments, the initiation of the spooling includes having the printer driver construct print job specific information, compile rendering instructions, and render preprocessed data into printer ready data or record journaled data for deferred playback. The print job(s) may, partly or in whole, be already rendered into printer ready data. Thus, a step of compiling rendering instructions may be skipped partly or entirely.

In exemplary embodiments, a determination may be made as to whether or not direct printing is to be employed. In direct printing systems, client devices 110 and 120 spool one or more print jobs without preprocessing (i.e., rendering or journaling) the document and/or image data through a printer driver. In these systems, the print data remains in the native document and/or image format, and the printing device is assumed to have the capability of interpreting/processing the respective formats. In one embodiment utilizing a direct printing system, the dialog presented to the user for selecting options specific to the printing device's capabilities includes a dialog on cluster printing. In an alternate embodiment, the dialog for selecting, cluster specific options may be presented by an application, background process, print processor, spooler, print assistant (i.e., any component not otherwise part of the print subsystem that is inserted into the printing process) or be pre-specified. Thus, in direct printing, the print data is not be preprocessed by a printer driver. Instead, the print job includes print job options and the document/image data in native format, and is spooled directly to the spooler.

Accordingly, if direct printing is to be employed, the one or more print jobs are provided to one or more printer devices for rendering. Alternatively, if direct printing is not to be employed, a spool file is despooled to a print processor.

FIG. 3 illustrates operational steps of print job receiving program 300, according to one embodiment of the present invention.

In an exemplary embodiment, in step 302, print job receiving program 300 receives requests for spooling print jobs. In step 304, print job receiving program 300 spools the print jobs in printer queue 102. The output from the print driver (i.e., spooled print job) is referred to as a spool file, with the contents generally referred to as spool data, and may be on disk, in memory, in cache or other forms of storage compatible with server computer 100.

FIG. 4 illustrates operational steps of print job destination program 400, according to one embodiment of the present invention. In exemplary embodiments, whenever a new print job enters printer queue 102, print job destination program 400 initiates. In another exemplary embodiment, print job destination program 400 initiates at other predetermined times, such as when print job receiving program 300 initiates.

In an exemplary embodiment, in step 402, print job destination program 400 determines an amount of available consumable resources for each of a plurality of printer devices. The consumable resources may be any number of resources that the printer devices consume during operation. Some examples may include, but are not limited to: paper, ink, toner, staples, etc. In an example, print job destination program 400 determines the amount of available consumable resources for printer devices 130 and 140 by accessing data stored therein through network 150. In another example, printer devices 130 and 140 send server computer 100 through network 150 data relating to the amount of consumable resources available at printer devices 130 and 140. Server computer 100 may store data relating to the amount of consumable resources available at printer devices 130 and 140 in storage 106 or some other location that is accessible by server computer 100.

In step 404, print job destination program 400 saves data related to the usage of the consumable resources for the plurality of printers for each printer job in the printer queue. In an example, print job destination program 400 saves the data related to the usage of the consumable resources for printer devices 130 and 140 by accessing the data stored therein through network 150. In another example, printer devices 130 and 140 send server computer 100 through network 150 the data related to the usage of the consumable resources available at printer devices 130 and 140. Server computer 100 stores data relating to the amount of consumable resources available at printer devices 130 and 140 in storage 106 or some other location that is accessible by server computer 100.

In step 406, print job destination program 400 determines an estimated usage of available consumable resources for each print job in the printer queue. In exemplary embodiments, print job destination program 400 determines the estimated usage of the available consumable resources for printer devices 130 and 140 by evaluating the type, size, and all of the other characteristics that leads to the consumption of consumable resources associated with each print job within printer queue 102. In an example, print job destination program 400 determines that a print job in the printer queue will use 2% of the toner and 5 sheets of paper of printer device 130 or printer device 140. In another example, print job destination program determines that a print job in printer queue will use 2% of the toner of printer device 130 and 5% of the toner of printer device 140, along with 5 sheets of paper.

In step 408, print job destination program 400 accesses a maintenance schedule related to the maintenance of the consumable resources for each of the plurality of printer devices. In an exemplary embodiment, print job destination program 400 accesses a maintenance schedule for printer device 130 and printer device 140 that is stored in storage 106 or some other location accessible by server computer 100.

In step 410, print job destination program 400 determining a print distribution plan for each print job in the printer queue based at least in part on the amount of available consumable resources for each of the plurality of printers, the estimated usage of consumable resources for the plurality of printers for each printer job in a printer queue, and the maintenance schedule related to the maintenance of the consumable resources for each of the plurality of printers. In an example, print job destination program 400 determines a schedule of a printer device destination for printer devices 130 and 140 for a first printer job and a second printer job within printer queue 102. In this example, printer device 130 is the default printer for both printing jobs. Printer device 130 has 5% of the ink remaining, 16% of the paper remaining, and is scheduled for maintenance in one hour. Printer device 140 has 2% of the ink remaining, 45% of the paper remaining, and is scheduled for maintenance in three minutes. Both printer device 130 and 140 are similar, so they will utilize the same amount of ink and paper to perform the same printer job. In this example, the first printer job uses 2% of the ink remaining and 1% of the paper remaining. Typically, printing device 130 would print the first print job because printing device is the default printing device. However, print job destination program 400 determines that since printer device 140 will be serviced in three minutes, the first print job is sent to printer device 140 to minimize downtime and to utilize all of the ink left in printer device 140 before maintenance occurs. In the example, a second printer job uses 2% of the ink remaining and 1% of the paper remaining. In this example, printer device 130 performs the second printer job, as this will lead to the shortest amount of downtime and utilize almost all of the ink left in printer device 130 before maintenance is to occur in approximately one hour.

In other exemplary embodiments, the determination made on which are the printer devices that will minimize the amount of downtime and utilize the largest amount of the consumable resources based off of a maintenance schedule may be made in a number of manners. For example, the determination may be based on a first available printer device; a time to availability of the printer devices; a capabilities matching of the printing devices to the printer job; a printer device speed; or another basis.

Regarding a first available printer device, considerations may include that the printer devices that are ready to print, (i.e., online, not in an error state, and not busy printing) and/or differences in the ready to print state, such as in the warm up cycle and power save modes.

Regarding the time to availability, considerations may include making estimates of when busy printer devices will complete their current job load and be available. Further considerations may include the time for warm up and power up cycles for printer devices in warm up or power-save modes. A printer device that is otherwise ready to print has zero time to availability (i.e., available immediately).

Regarding the capabilities matching, the determination is based on printers whose capabilities best match the requirements of the print job(s). The determination may consider capabilities emulation that can be performed by the computing device that are otherwise not supported on the printing device (e.g., collation, stapling).

Those skilled in the art will appreciate that at least some embodiments of the present invention embrace establishing a preference order for job splitting processes (e.g., copy splitting, document splitting, color/black and white separation).

In step 412, print job destination program 400 determines an updated maintenance schedule related to the maintenance of the consumable resources for each of the plurality of printers based at least in part on the saved data related to the usage of the consumable resources for the plurality of printers for each printer job in the printer queue. In exemplary embodiments, print job destination program 400 may determine that the printing jobs for printer devices 130 and 140 occur in a high volume at the beginning and end of a workday. Therefore, the printer job destination program 400 determines to change or update the maintenance schedule to restock sheets of paper within printer devices 130 and 140 at lunchtime and at the end of the workday to minimize downtime and optimize the consumption of the consumable resources of printer devices 130 and 140.

In step 414, print job destination program 400 sends a notification to a client device of an altered print destination of the plurality of printers for a print job of the one or more print jobs. In an example, print job destination program 400 sends an electronic message through network 150 to client device 110 that a print job will no longer be printed at printer device 130, but rather at printer device 140. In exemplary embodiments, the notification is any form of notification that alerts a user with access to client device 110 that the print job destination has changed. Some examples of notifications may be, but are not limited to: electronic messages, such as SMS, MMS, emails, etc.

After print job destination program 400 determines the printer device destination of the printing jobs within the printer queue, the printer queue despools (immediately or delayed) the spool file to the associated print processor for the selected printer device(s) The print driver reads the spool file and determines if the content is preprocessed printer ready data. If the print data is printer ready data, the print driver writes the print data directly to a port manager(s) of the corresponding printing device(s).

Alternatively, if it is determined that the content of the spool file is journaled, the print driver plays back the journaled data to the printer driver(s) associated with the corresponding printing device(s). The printer driver(s) then render the journaled data and spool the printer ready data to the spooler. The printer queue writes the printer ready data directly to the port manager(s) of the corresponding printing device(s). Once the print data is written to the port manager, the print data is transmitted to the printer device(s) for the rendering of the print job(s).

In some embodiments, the step of playing back the journaled data to the printer driver is alternatively deferred to a printer server. In this case, the printer queue writes the journaled data directly to the port manager(s) of the printer server (s) associated with the corresponding printing devices. The journaled data is then spooled to a print queue on the printer server. The server spooler (i.e., on the printer server) despools (immediately or delayed) the spool file to the associated printer server for the selected printing device(s). The server print processor plays back the journaled data to the server printer driver(s) associated with the corresponding printing device(s). The server printer driver(s) then render the journaled data and spool the printer ready data to the server spooler. The server spooler writes the printer ready data directly to the server port manager(s) of the corresponding printing device(s).

In some embodiments, the step of playing back the journaled data to the printer driver is alternatively deferred to a printer server. In this case, the spooler writes the journaled data directly to the port manager(s) of the printer server(s) associated with the corresponding printing devices. The journaled data is then spooled to a print queue on the printer server. The server spooler (i.e., on the printer server) despools (immediately or delayed) the spool file to the associated printer server for the selected printing device(s). The server print processor plays back the journaled data to the server printer driver(s) associated with the corresponding printing device(s). The server printer driver(s) then render the journaled data and spool the printer ready data to the server spooler. The server spooler writes the printer ready data directly to the server port manager(s) of the corresponding printing device(s).

FIG. 5 depicts a block diagram of components of server computer 100, client devices 110 and 120, and printing devices 130 and 140 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server computer 100, client devices 110 and 120, and printing devices 130 and 140 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Printing program 200 on client devices 110 and 120 and print job receiving program 300 and print job distribution program 400 on server computer 100 are stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Printing program 200 on client devices 110 and 120 and print job receiving program 300 and print job distribution program 400 on server computer 100 may be downloaded to persistent storage 508 through communications unit 510.

I/O interface(s) 512 allows for input and output of data with other devices that may be connected to server computer 100, client devices 110 and 120 and printing devices 130 and 140. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., printing program 200 on client devices 110 and 120 and print job receiving program 300 and print job distribution program 400 on server computer 100, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for print job distribution, the computer program product comprising:
one or more non-transitory computer-readable storage media and program instructions stored on the one or more computer-readable storage media, the program instructions comprising:
program instructions to determine an amount of a first consumable resource for each of a plurality of printers;
program instructions to determine an estimated usage of the first consumable resource for each of the plurality of printers for one or more printer jobs in a printer queue;

program instructions to access a predetermined maintenance schedule for replacing the first consumable resource for each of the plurality of printers; and program instructions to determine a print distribution plan for each print job in the printer queue based at least in part on the amount of the first consumable resource for each of the plurality of printers, the estimated usage of the first consumable resource for the plurality of printers for each printer job in a printer queue, and the predetermined maintenance schedule for replacing the first consumable resource for each of the plurality of printers, wherein:

the print distribution plan operates to decrease the amount of the first consumable resource wasted upon being replaced based on the predetermined maintenance schedule; and the print distribution plan operates to minimize the amount of downtime of the plurality of printers based on the predetermined maintenance schedule.

2. The computer program product of claim 1, further comprising:

program instructions to save data related to an actual usage of the first consumable resource for the plurality of printers for each of the one or more printer jobs in the printer queue; and program instructions to determine an updated predetermined maintenance schedule for replacing the first consumable resource for each of the plurality of printers based, at least in part, on the saved data related to the actual usage of the first consumable resource for the plurality of printers for each of the one or more printer jobs in the printer queue.

3. The computer program product of claim 1, further comprising:

program instructions to send a notification to a computing device of an altered print destination of the plurality of printers for a print job of the one or more print jobs.

4. The computer program product of claim 3, wherein the notification is an electronic message.

5. The computer program product of claim 1, wherein the determining a print distribution plan for each of the plurality of print jobs in the printer queue includes splitting at least one of the one or more printer jobs in the printer queue.

6. The computer program product of claim 1, wherein the determining a print distribution plan for each of the plurality of print jobs in the printer queue includes capabilities matching of the printing devices to each of the plurality of print jobs.

7. A computer system for print job distribution, the computer system comprising:

one or more computer processors;

one or more computer-readable storage media;

program instructions stored on the computer-readable storage media for execution by at least one of the one or more processors, the program instructions comprising:

program instructions to determine an amount of a first consumable resource for each of a plurality of printers;

program instructions to determine an estimated usage of the first consumable resource for each of the plurality of printers for one or more printer jobs in a printer queue;

program instructions to access a predetermined maintenance schedule for replacing the first consumable resource for each of the plurality of printers; and program instructions to determine a print distribution plan for each print job in the printer queue based at least in part on the amount of the first consumable resource for each of the plurality of printers, the estimated usage of the first consumable resource for the plurality of printers for each printer job in a printer queue, and the predetermined maintenance schedule for replacing the first consumable resource for each of the plurality of printers, wherein:

the print distribution plan operates to decrease the amount of the first consumable resource wasted upon being replaced based on the predetermined maintenance schedule; and the print distribution plan operates to minimize the amount of downtime of the plurality of printers based on the predetermined maintenance schedule.

8. The computer system of claim 7, further comprising:

program instructions to save data related to an actual usage of the first consumable resource for the plurality of printers for each of the one or more printer jobs in the printer queue; and program instructions to determine an updated predetermined maintenance schedule for replacing the first consumable resource for each of the plurality of printers based, at least in part, on the saved data related to the actual usage of the first consumable resource for the plurality of printers for each of the one or more printer jobs in the printer queue.

9. The computer system of claim 7, further comprising:

program instructions to send a notification to a computing device of an altered print destination of the plurality of printers for a print job of the one or more print jobs.

10. The computer system of claim 9, wherein the notification is an electronic message.

11. The computer system of claim 7, wherein determining a print distribution plan for each of the plurality of print jobs in the printer queue includes splitting at least one of the one or more printer jobs in the printer queue.

12. The computer system of claim 7, wherein determining a print distribution plan for each of the plurality of print jobs in the printer queue includes capabilities matching of the printing devices to each of the plurality of print jobs.

* * * * *